United States Patent
Bard et al.

(10) Patent No.: US 8,433,365 B2
(45) Date of Patent: Apr. 30, 2013

(54) MOBILE DEVICES HAVING FAX CAPABILITIES

(75) Inventors: Thomas Austin Bard, Roswell, GA (US); Roger C. Mahn, Roswell, GA (US); Morgan Daniel Woxland, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 349 days.

(21) Appl. No.: 12/820,994

(22) Filed: Jun. 22, 2010

(65) Prior Publication Data
US 2011/0312380 A1    Dec. 22, 2011

(51) Int. Cl.
*H04B 1/38*    (2006.01)
(52) U.S. Cl.
USPC ........................ 455/557; 455/556.1; 455/556.2
(58) Field of Classification Search .................. None
See application file for complete search history.

(56) References Cited

U.S. PATENT DOCUMENTS

| | | | |
|---|---|---|---|
| 6,879,824 B1 * | 4/2005 | Yokoi et al. | 455/414.1 |
| 2005/0153739 A1 | 7/2005 | Halsell | |
| 2005/0159168 A1 | 7/2005 | Benco | |
| 2006/0135202 A1 | 6/2006 | Ho | |
| 2007/0066355 A1 | 3/2007 | Silverbrook | |
| 2010/0056049 A1 * | 3/2010 | Hu | 455/41.2 |
| 2010/0128291 A1 * | 5/2010 | Vendrow et al. | 358/1.9 |

* cited by examiner

*Primary Examiner* — Erika A Washington
(74) *Attorney, Agent, or Firm* — Hartman & Citrin LLC

(57) ABSTRACT

Devices, systems and methods are disclosed which relate to incorporating a fax machine function into a mobile device. A camera on the mobile device is used to scan or capture an image of an existing document. Logic on the mobile device converts the image into a fax transmittal that can be transmitted to a fax machine. Once the fax transmittal is ready, a connection is initiated with a traditional fax machine across one or more networks, and the fax transmittal is sent to the fax machine at a speed determined by the slower device. Upon a successful transmission, the connection is terminated, and a report is generated.

14 Claims, 9 Drawing Sheets

MOBILE DEVICES HAVING FAX CAPABILITIES

BACKGROUND OF THE INVENTION

1. Field of the Invention

The present invention relates to mobile devices. In particular, the present invention relates to sending and receiving fax transmittals using mobile devices.

2. Background of the Invention

The old faithful standby for transferring copies of existing paper documents across networks is the facsimile (or fax) machine. Fax machines have existed since the 1970s, and are still in use today. Generally, a fax machine has an image sensor that uses light to scan a material to be faxed, a fax modem that converts the scanned data into digital format or vice versa, a phone line for the transmission of the fax transmittal, and a printer that produces printouts of received faxes. Various compression techniques can be used to transmit the fax transmittal across a telephone line. The data is transmitted using electrical pulses that represent black and white dots on the scanned image, wherein the fax transmittal is reproduced at the destination by printing dots corresponding to the received pulses. Fax machines set up connections with each other across telephone lines by using a "handshake" where the machines agree on a speed and a type of transmission.

Fax technology has faced increasing competition from internet based alternatives. Specifically, mobile devices, e-readers, and broadband networks enable exchange of information in all forms. The speed of transmission over modern network, such as an Internet Protocol (IP) network, is several magnitudes faster than the speed at which fax machines communicate. However, fax machines still retain some advantages. Sensitive material transmitted over the internet could potentially be intercepted. Further, the laws of some countries do not recognize electronic signatures, while faxed contracts with copies of signatures are valid. Moreover, a general mistrust of electronic devices exists and stems from hard drive failures, network failures, data corruption, etc., resulting in additional comfort and safety by relying on paper copies. Therefore, fax machines enjoy continued support in businesses.

However, fax technology has not evolved much relative to the evolution of mobile technology. Fax machines are bulky, tied to land lines, and therefore immobile. Further, they are not ubiquitously available. For instance, a corporate user cannot easily access fax machines while traveling. Several other drawbacks inherent to faxes will be recognized by one of ordinary skill in the art.

Existing methods to mitigate these drawbacks include sending faxes over the internet, using mobile devices as fax modems, Fax over IP (FoIP), etc. For instance, a user can scan and upload a document to a fax server across a network. The fax server transmits the fax to a traditional fax machine using known techniques. Alternatively, a mobile device can be coupled to a computer to be used as a fax modem. The computer uses the mobile device as a network interface to dial out to the fax machine and transmit the scanned image to the destination fax machine. Fax over IP involves sending packets of data across an IP network to another IP-enabled destination, wherein the received packets are used to reconstruct the image and print the transmittal.

However, these known techniques have their own issues. For instance, faxing over the internet requires, first, an internet connection. Second, it requires a user to upload the fax transmittal to a secondary server on the internet. Besides the obvious security issues involved, this still requires the use of an intermediary between the source and destination, and is therefore not as faithful or ideal to the original fax method that uses a direct connection between the two devices. In addition, using the phone as a modem has its own issue, namely, that two devices are used to send the fax: a computer, and a mobile device. Further the computer needs to be coupled to a scanner in order to convert an existing paper document into a fax transmittal. Finally, Fax over IP requires that both source and destination devices be IP-enabled. This renders FoIP incompatible with existing fax machines in use today.

What is needed, therefore, is the ability to create and transmit fax transmittals from a mobile device to another device across a network, including fax machines.

SUMMARY OF THE INVENTION

The present invention solves the above problems by incorporating a fax machine into a mobile device. A camera on the mobile device is used to scan or capture an image of an existing document. Logic on the mobile device provides the technique or means to convert the image into a fax transmittal that can be transmitted to a fax machine. This is performed by adjusting a size of the captured image, cropping portions of the image, and even annotating/signing the captured image. Once the fax transmittal is ready, a connection is initiated with a traditional fax machine across one or more networks, and the fax transmittal is sent to the fax machine at a speed determined by the slower device (in most cases, the traditional fax machine). Upon a successful transmission, the connection is terminated, and a report is generated.

In one exemplary embodiment, the present invention is a mobile device having fax capabilities, including a processor, a memory in communication with the processor, a transceiver in communication with the processor, an image sensor in communication with the processor, a display in communication with the processor, imaging logic on the memory, the imaging logic enabling a user to scan a document into an image using the image sensor, adjust the image, and convert the adjusted image into a fax transmittal, and fax logic on the memory, the fax logic enabling the user to initiate an outgoing connection with a destination device over a network, and transmit the fax transmittal to the destination device. The imaging logic further comprises a user interface enabling the user to adjust a size of the image, the size of the image corresponding to a paper size of the fax transmittal. The user interface further enables a user to append notations to the image, the notations including at least a signature and a cover page, wherein the fax transmittal comprises the adjusted image with notations, the signature, and the cover page. The image sensor can be a camera. The user can transmit the fax transmittal to a plurality of destination addresses including an email address. The fax logic further comprises a fax receiving logic to determine that an incoming connection is a fax transmittal.

In another exemplary embodiment, the present invention is a system for transmitting a fax transmittal from a mobile device, the system including a mobile device connected to a network, the mobile device including a camera for scanning a fax transmittal, and logic for adjusting and transmitting the fax transmittal across the network, a destination device for receiving the fax transmittal, and a plurality of servers on the network to provide an outgoing connection between the mobile device and the destination device, wherein the mobile device further includes a user interface enabling a user to adjust a page size of the fax transmittal before transmitting. The user interface further enables a user to append notations to the image, the notations including at least a signature and a cover page, wherein the fax transmittal comprises the adjusted image with notations, the signature, and the cover page. The plurality of servers includes a gateway server for connecting a cellular and/or Internet Protocol (IP) network to a Public Switched Telephone Network (PSTN).

In yet another exemplary embodiment, the present invention is method for transmitting a fax transmittal from a mobile device having a camera, the method including capturing an image of a document with the camera, adjusting the image via a user interface on the mobile device, the adjusting including at least one of cropping and resizing the image, converting the cropped and resized image into a fax transmittal, initiating a connection with a destination device on a network, and transmitting the fax transmittal to the destination device. The converting step further comprises at least one of: appending notations to the image, appending a signature to the image, and adding a cover page to the image, wherein the fax transmittal comprises the adjusted image with at least one of the notations, the signature, and the cover page. The method further comprises transmitting the fax transmittal to a plurality of addresses, the plurality of address including an e-mail address. The method further comprises receiving an incoming connection at the mobile device, determining that the incoming connection is a received fax transmittal, and storing the received fax transmittal as a received image on the mobile device.

DETAILED DESCRIPTION OF THE INVENTION

Figure 1A:
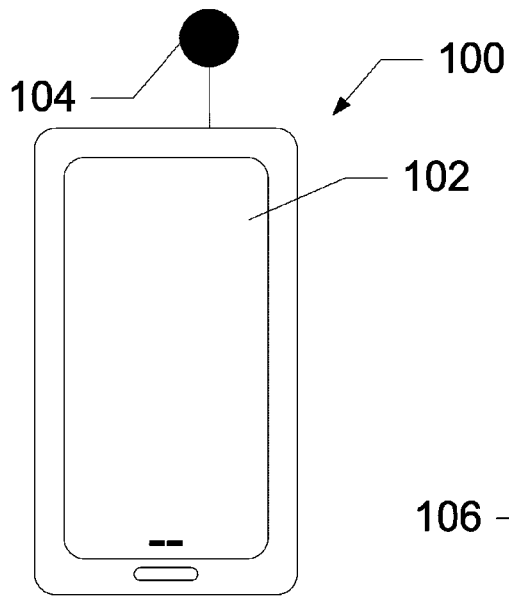
FIGS. 1A-1C show the components of a mobile device having fax capabilities, according to an exemplary embodiment of the present invention.

The present invention provides a novel technique for creating a fax transmittal from a document and sending the fax transmittal to a destination device across a network, using a mobile device. The mobile device includes a camera to capture an image of the document to be transmitted. An application or user interface on the mobile device enables a user to adjust the scanned image in several ways, including selecting a page size of the fax transmittal. Annotations, signatures, and cover sheets can be added to the fax transmittal. A fax logic on the mobile device initiates a connection with the destination device across the network, for instance, by dialing out to a fax machine. Upon answering, a handshake operation between the two devices is performed to set up a connection. When connected, the fax logic transmits the fax transmittal to the fax machine at a speed determined by the handshake operation. Upon completion, a report can be generated.

The user is additionally provided with an option to transmit the fax transmittal to a plurality of addresses on different networks. For instance, the user can send a copy of the fax to an e-mail address, or to another fax machine. The user can queue the fax transmittals, schedule the sending for a later time, etc. The invention further features a fax receiving mechanism whereby an incoming connection is determined to be from a fax machine. The incoming fax transmittal from the fax machine is decoded at the mobile device, and can be displayed on a display of the mobile device, stored to e-mail, and/or printed on a printer.

As used herein and throughout this disclosure, the term "mobile device" refers to any electronic device capable of wirelessly sending and receiving data across a network. A mobile device may have a processor, a memory, a transceiver, an input, and an output. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A mobile device also includes a transceiver to connect to a network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of networks include cellular, General Packet Radio Service (GPRS), Wi-Fi, and Bluetooth® networks. Networks also include plain old telephone service (POTS), public switched telephone networks (PSTN), etc. Networks can include a plurality of elements that host logic for performing tasks on the network such as setting up connections between devices. Networks can further include servers or elements such as gateways that enable communication between two different types of networks. An example of a gateway is a GPRS support node (GSN). Mobile devices may have more than one transceiver, capable of communicating over different networks, for instance, a GPRS transceiver for communicating with a cellular base station, a Wi-Fi transceiver for communicating with a Wi-Fi network, and a Bluetooth® transceiver for communicating with a Bluetooth® device. Further, mobile devices may make use of network interfaces to enable a particular transceiver to communicate with the particular network. An example of a network interface is a Subscriber Identity Module (SIM) card for cellular networks.

A "fax machine" is any hardware or software that is capable of communicating across a network using International Telecommunication Union (ITU-T) standards. This includes, but is not limited to, group 1 and 2 analog transmission, group 3 and 4 digital transmission and compression, and so on. Further, a "fax machine" can be incorporated in any existing device, as will be evident in light of this disclosure. Conversely, a "traditional fax machine" is one that exists in the conventional art, described in the background section above, and will be identified as such throughout this disclosure. A fax machine is used to transmit documents across a network. A "document" includes any combination of text and images that can be photographed by a digital camera and transmitted as a fax transmittal.

For the following description, it can be assumed that most correspondingly labeled structures across the figures (e.g., 132, 232 and 332, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1B:
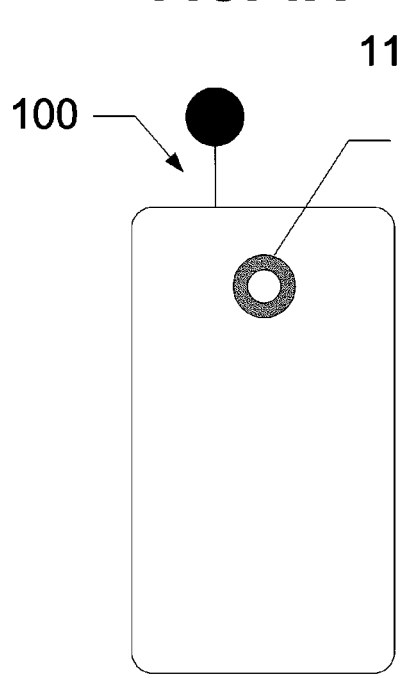
Figure 1C:
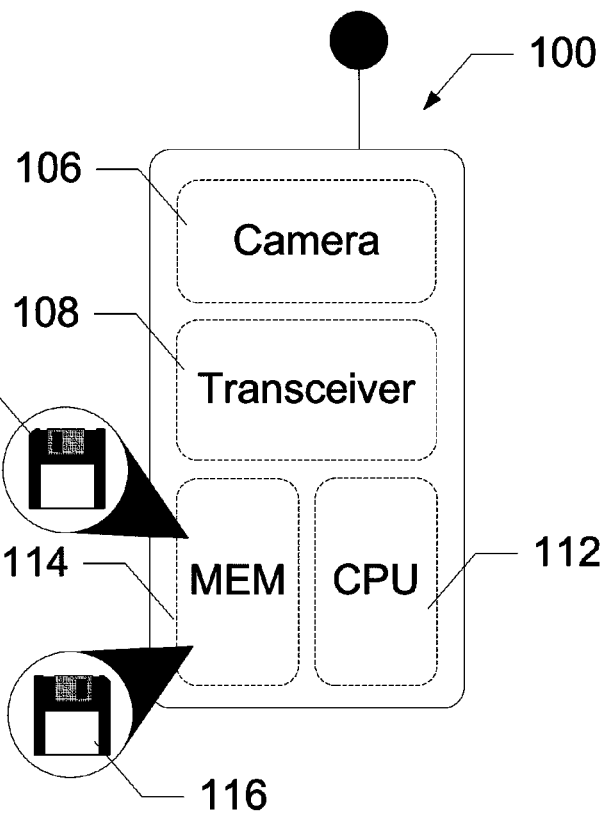

FIGS. 1A-1C show the components of a mobile device 100 having fax capabilities, according to an exemplary embodiment of the present invention. With respect to FIG. 1A, mobile device 100 includes a display 102 and antenna 104. Display 102 is a touchscreen, and therefore can be used as both an input and an output device. Antenna 104 converts radio waves into electrical signals to be received by a transceiver 108. Antenna 104 is shown to be external but can also be encased within a housing of mobile device 100. FIG. 1B shows the back side of mobile device 100. A camera 106 is included, and is used as an optical scanner to capture images of documents to be faxed. Camera 106 can include any standard digital camera lens and charge-coupled device (CCD), or any other camera known in the art. Camera 106 can include an LED or similar flash (not shown). FIG. 1C shows the inner components of mobile device 100. These include but are not limited to: CCD (which may be coupled to and/or part of the camera 106), transceiver 108, processor 112, memory 114, imaging logic 115 and fax logic 116. The camera 106, transceiver 108, processor 112, and memory 114 are known in the art and need not be described in great detail. Suffice to say, transceiver 108 enables communication with external networks via antenna 104. Memory 114 stores logic that instructs processor 112 to operate the various components of mobile device 100, and to present a user interface on display 102. Besides imaging logic 115 and fax logic 116, other logic such as operating systems, applications, telephone software, etc. can be present, is well known, and need not be described. Further, other features can also be included and are not shown, such as slide-out keyboards, projectors to project an image, camera flashes, Global Positioning System (GPS) units, accelerometers, and so on.

Imaging logic 115 comprises applications that enable a user to operate camera 106, and to make any adjustment to the captured image. This is accomplished by a user interface further described below. Briefly, a user is presented with alignment tabs, such as alignment lines or an alignment grid, which can be used to line up a document in view of camera 106, and capture the aligned document image. Once captured, the document image can be adjusted with respect to cropping edges, and scaling the image to a pre-defined page size. This is useful so as to conform to requirements of the user or of the receiving entity. Brightness and contrast adjustments are also possible. Imaging logic 115 can also include Optical Character Recognition (OCR) software to detect alphanumeric characters in the scanned document. Imaging logic 115 can also include notation abilities. These enable a user to add annotations to the scanned image, such as notes, highlighting, underlining, etc. A user is also provided with an ability to add his or her signature to the image, for instance, using a finger or a stylus on display 102. Other options are possible, such as the addition of a cover page to the image. An adjusted image, along with any annotations, signatures, and cover sheets, becomes a fax transmittal.

Once ready, the fax transmittal is passed on to fax logic 116. This can be performed by deciding to "send" the transmittal. The user is prompted to dial a number or select a number from an address book. Fax logic 116 uses transceiver 108 to initiate a connection with the selected number or address over a network. For instance, fax logic 116 dials a phone number of a fax machine on a PSTN network. One or more network elements may be traversed in order to initialize/set up the connection. This includes signaling between elements, wherein the signals include dialing, receiving a ringtone, answering, acknowledgements, etc. One example of such signaling across a PSTN network is SS7 signaling. Upon detecting that the destination device has answered, a handshake operation is initiated between mobile device 100 and the destination fax machine. The handshake operation consists of a series of signals transmitted back and forth, negotiating a type, a speed, compression, and other attributes of the connection. Upon completion of the handshake, fax logic 116 begins transmitting the fax transmittal to the destination fax machine. This transmittal can emulate a standard fax transmittal known in the art. One or several pages of the fax transmittal are transmitted using these methods. Upon completion, a final acknowledgement signal is transmitted, and the connection is torn down.

In further embodiments of the present invention, the mobile device includes a fingerprint scanner. A user may scan his or her fingerprint to provide further authentication of the user. The fingerprint of the user may be used in lieu of or in addition to the signature capture capability of the mobile device. Alternatively, the fingerprint scanner may provide access to the faxing application. Such a feature may prevent unauthorized users from sending a fax from the mobile device.

Figure 2:
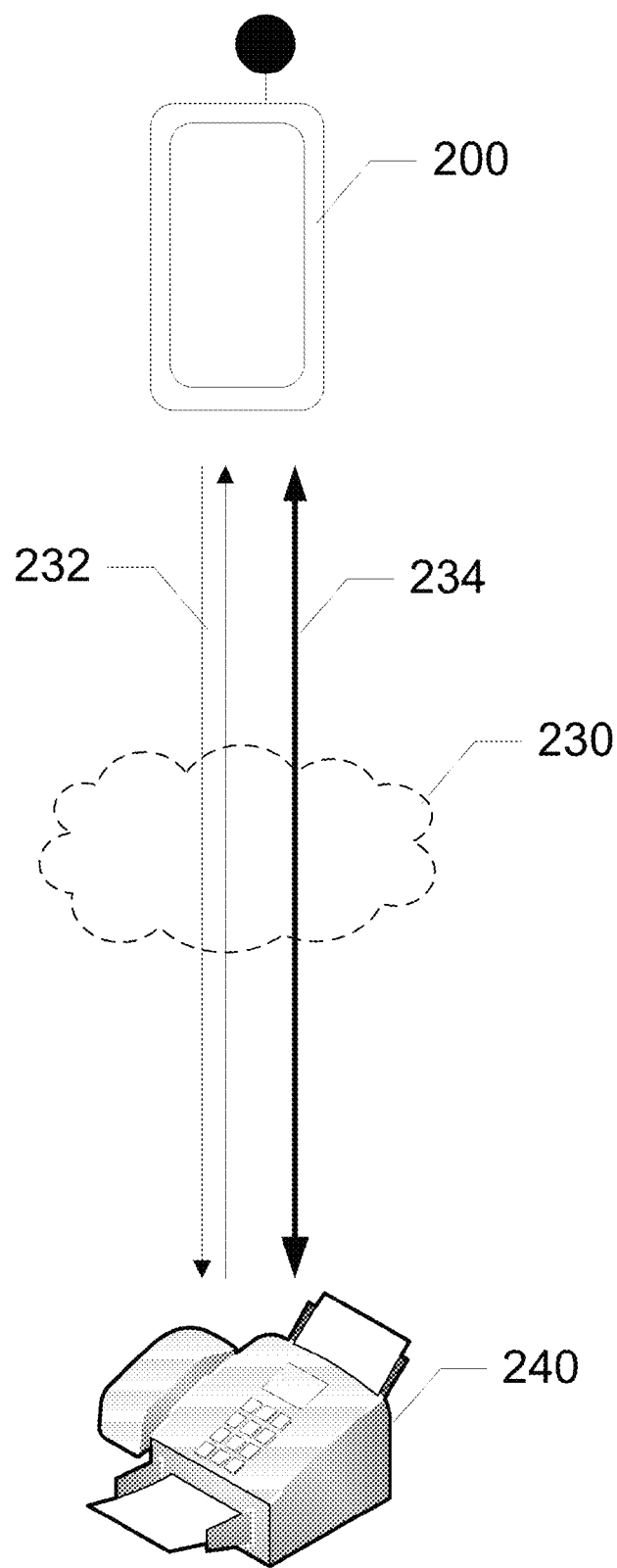
FIG. 2 shows a system for sending and receiving faxes using a mobile device, according to an exemplary embodiment of the present invention.

FIG. 2 shows a system for sending and receiving faxes using a mobile device 200, according to an exemplary embodiment of the present invention. Mobile device 200 communicates with fax machine 240 across network 230. Initiation of a connection 234 between the two devices is first accomplished by signaling 232, which could be SIP signaling, SS7 signaling, or any other protocol for setting up a connection based on the type of network being traversed. For instance, network 230 is a PSTN network, in which case SS7 signaling is used. When network 230 is an IP Multimedia System (IMS) network, SIP signaling may be used. Other examples are possible. In either instance, connection 234 is a direct connection between the two devices, and allows mobile device to send fax transmittals bit by bit or line by line to fax machine 240. Conversely, fax machine 240 can initiate a connection with mobile device 200 using signals 232, and initiate connection 234 across network 230. Fax machine 240 would transmit a scanned image of a document across connection 234 to mobile device 200, using the ITU-T protocols described above and known in the art. Mobile device 200 would then decode the received data, and reconstruct an image on its display. Optionally, the received image could be sent to a printer, to an email address, or stored locally on mobile device 200, including any external memory or storage currently in use by mobile device 200.

Figure 3:
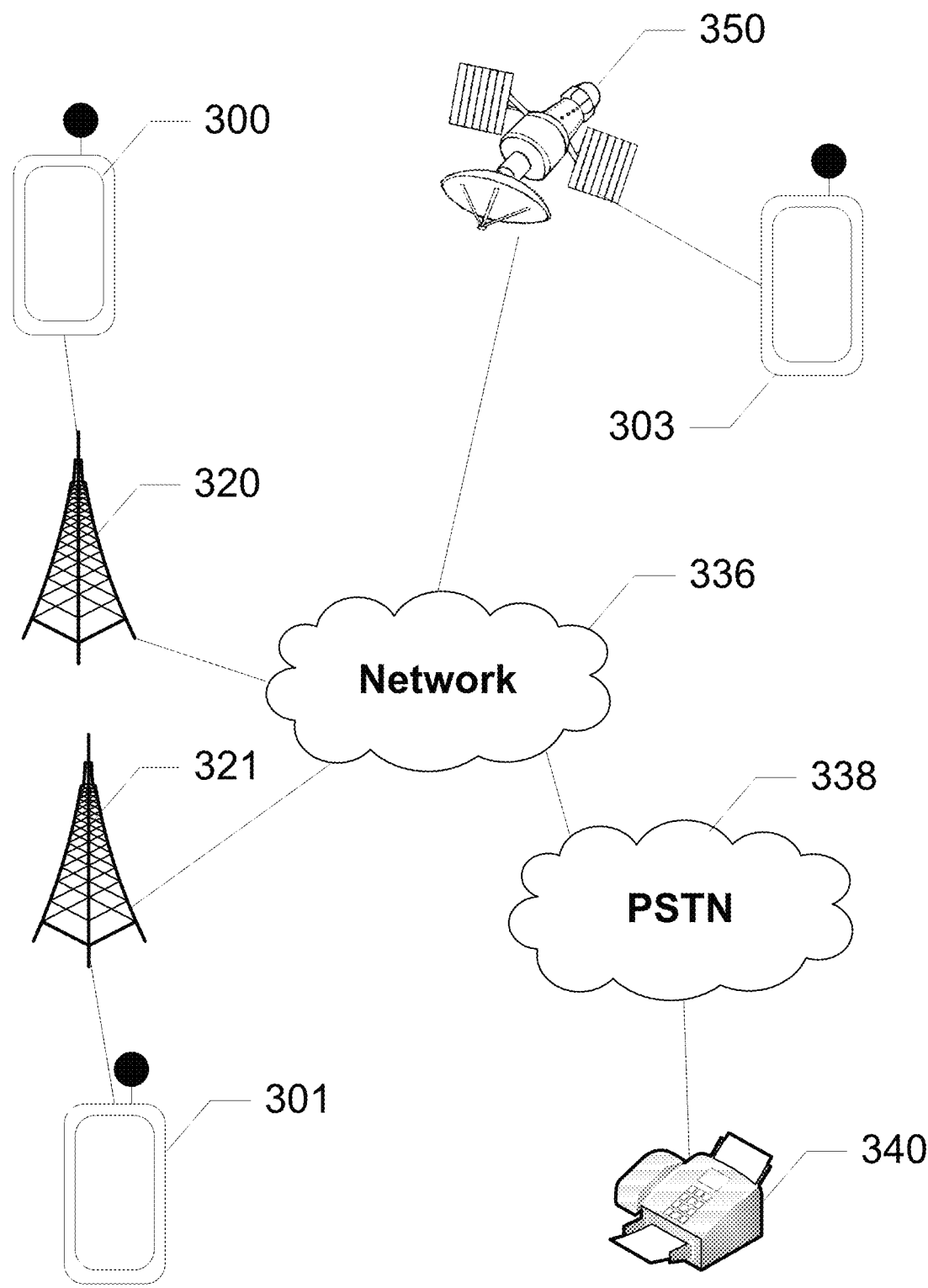
FIG. 3 shows a system for transmitting faxes across a variety of devices, according to an exemplary embodiment of the present invention.

FIG. 3 shows a system for transmitting faxes across a variety of devices, according to an exemplary embodiment of the present invention. The system includes a mobile device 300 for sending and receiving faxes. Mobile device 300 is in communication with radio 320, enabling communication with a service provider's network 336. Further, mobile device 301 is also in communication with service provider's network 336 via radio 321. Another mobile device in this system is satellite phone 303, in communication with the service provider's network 336 via a geosynchronous satellite 350. Finally, a traditional fax machine 340 is in communication with the service provider's network via a PSTN network 338. It will be understood that several additional elements are included for this system to function, but are not shown. For instance, radio network controllers mediate communications between radios 320-321 and service provider's network 336. For instance, gateways such as GSNs mediate communications between network 336 and PSTN network 338. Other servers such as proxy servers, media servers, etc. will be apparent to one skilled in the art when implementing the present invention in different network environments such as IMS, long-term evolution (LTE), etc.

The present invention is able to provide a fax sending and receiving mechanism in each one of devices 300, 301, 303, and 340. Mobile devices 300, 301, and 303 include a camera or other image sensor for capturing an image of a document to be faxed. Further, each of mobile devices 300, 301, and 303 include a user interface to adjust the captured image to conform to a page size for sending fax transmittals, as well as to add annotations, signatures, and cover pages. A fax logic on each of mobile devices 300, 301, 303, initiates a connection with a destination device via network 336 and other elements. A direct connection is set up between the source and destination. If the destination is one of device 300, 301, and 303, then the direct connection could be an IP-based connection. In this case, fax machines within each of devices 300, 301 and 303 negotiate a connection speed and type with each other. Further, if network 336 is IP-enabled, devices 300, 301 and 303 can use fax over IP. In case fax machine 340 is one of the parties to the connection, a direct connection is set up between one of devices 300, 301, and 303, and fax machine 340, and a handshake operation is used to determine the speed and connection type of fax machine 340. Either source device will adjust a sending or receiving speed to conform to the requirements of fax machine 340.

Figure 4:
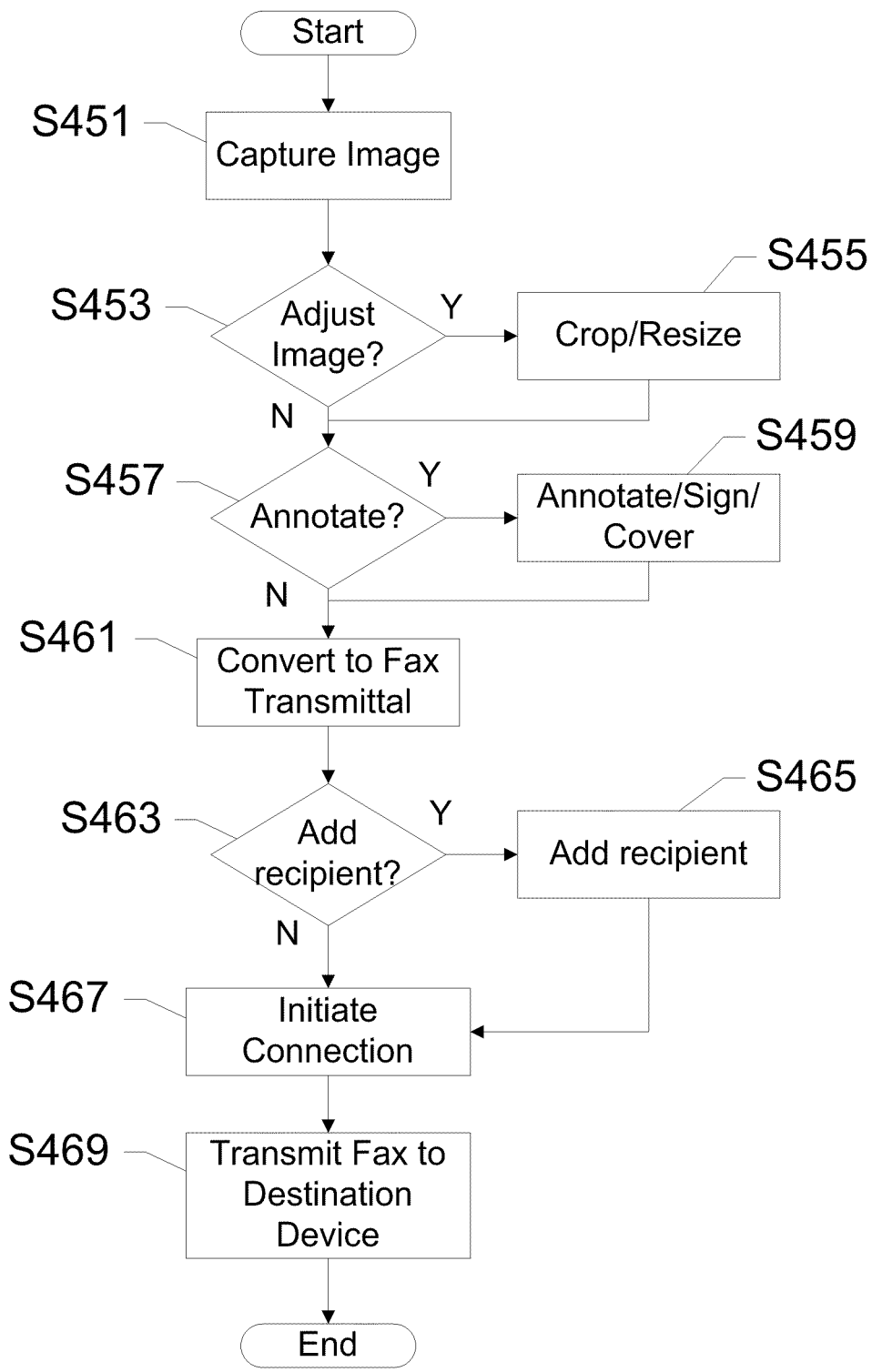
FIG. 4 shows a method for transmitting a fax from a mobile device, according to an exemplary embodiment of the present invention.

FIG. 4 shows a method for transmitting a fax from a mobile device, according to an exemplary embodiment of the present invention. According to the method, an image is captured S451 using a camera incorporated within the mobile device. The image is usually of a document; however, the image can be of any object that is capable of being reproduced in a black and white printout at a destination device. Capturing the image S451 can include lining the image up with alignment tabs displayed on a user interface on the mobile device, and then activating a shutter. The image is stored in any known format on the mobile device having the camera, and then can be adjusted S453 using any number of adjustment tools provided by the user interface. For instance, a user may elect to crop or resize S455 the image to conform to a particular page size, such as A4, or letter. If no adjustment is needed, or after adjustment is complete, the user is given an option to append annotations S457 to the image. The user may choose to append annotations, a signature, or a cover page S459 to the image. All, some, or none of these options can be exercised. After an image is adjusted and/or annotated, the resulting product becomes a fax transmittal S461. The fax transmittal can have a specific number of pages. All the pages are elected to be transmitted to a recipient S463. If more recipients are selected S465, then the recipients are added to a recipient list. Recipients can include phone numbers of fax machines over a PSTN network or combination of networks, as well as other addresses such as SIP addresses, e-mail addresses, etc. A connection is initiated S467 with each destination address. For traditional fax machines, this involves dialing a phone number of the fax machine, handshaking with the fax machine, and transmitting the fax transmittal S469. Other types of fax machines involve their own setting up, handshaking, and transmission procedures.

Figure 5:
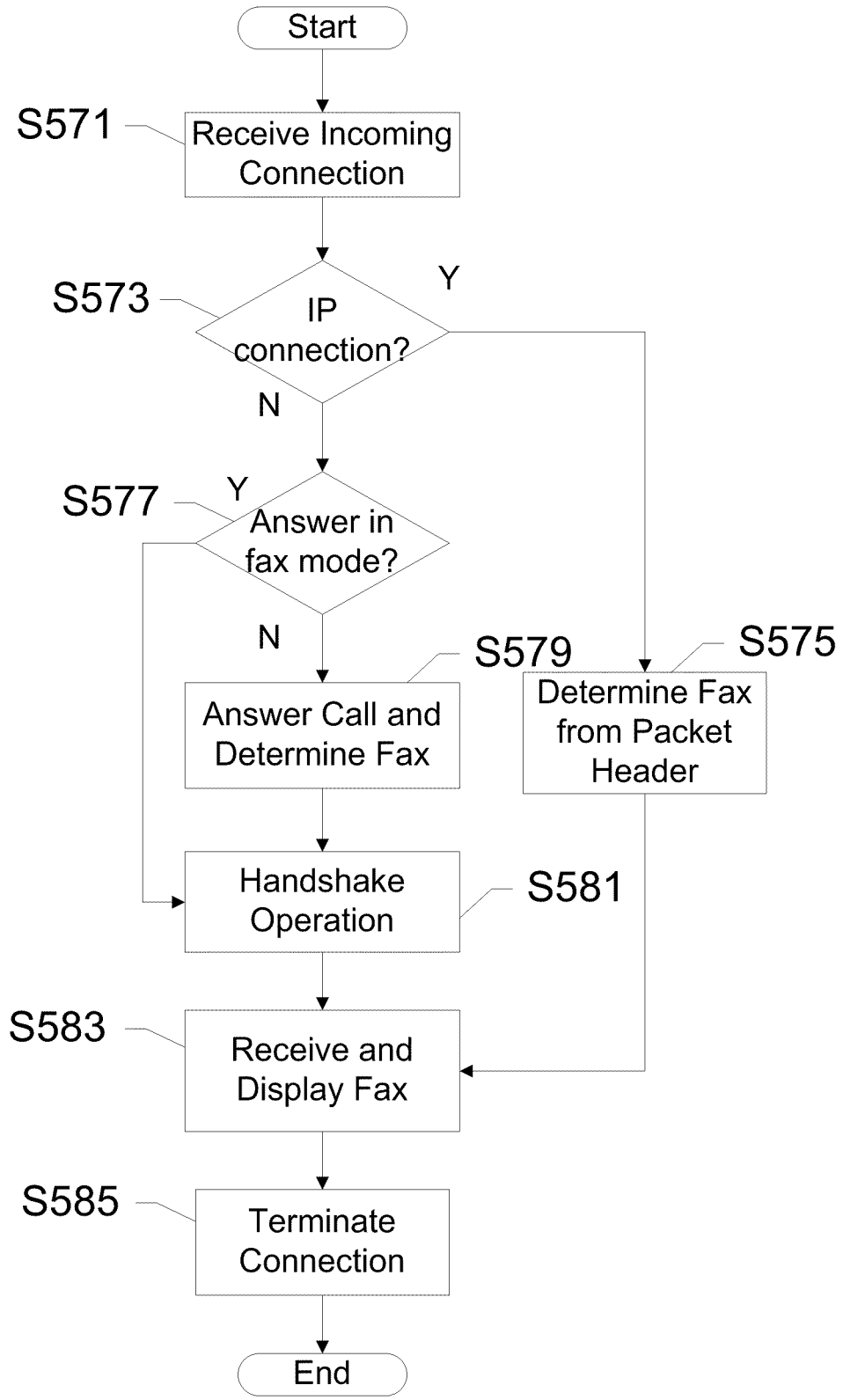
FIG. 5 shows a method for receiving a fax at a mobile device, according to an exemplary embodiment of the present invention.

FIG. 5 shows a method for receiving a fax at a mobile device, according to an exemplary embodiment of the present invention. An incoming connection is received S571 at the mobile device. The incoming connection S571 is received across a network, and can occur in many forms. In this instance, a determination is made S573 as to whether incoming connection is an Internet Protocol (IP) connection or an ordinary phone call. If the incoming connection is an IP connection, then a packet header is parsed S575 to determine a source of the connection. A source can identify itself as a fax machine on another entity or device, and if this determination is made S575, then the fax is received and displayed S583 on the mobile device. However, if the incoming connection is a regular call, then a user is provided with a prompt of whether to answer, ignore, or answer as fax S577. Answering as fax is useful when the user knows that the incoming call is a fax call. Alternatively, answering as fax can be an automatic feature if it is determined that the incoming call is from a fax number, this determination being made by a fax receiving logic within fax logic referring to a phone book on the user's mobile device.

When answered in fax mode, the handshake operation S581 begins, to determine a connection type and speed for receiving the fax. On the other hand, when answered in a regular mode S579, the signals that are received upon answering are monitored. Fax logic on the mobile device determines that the received incoming call is, in fact, from a fax machine. This can be done by listening for a handshake signal from the calling device. Once determined as a fax, the handshake operation S581 begins. Handshake operation enables a connection of a certain type and speed to be set up between the two devices, upon which the fax is received S583 on the mobile device and displayed on a display of the mobile device. Other options may be offered, i.e. to print, email, or forward the fax. Once received, the connection is terminated S585.

Figure 6:
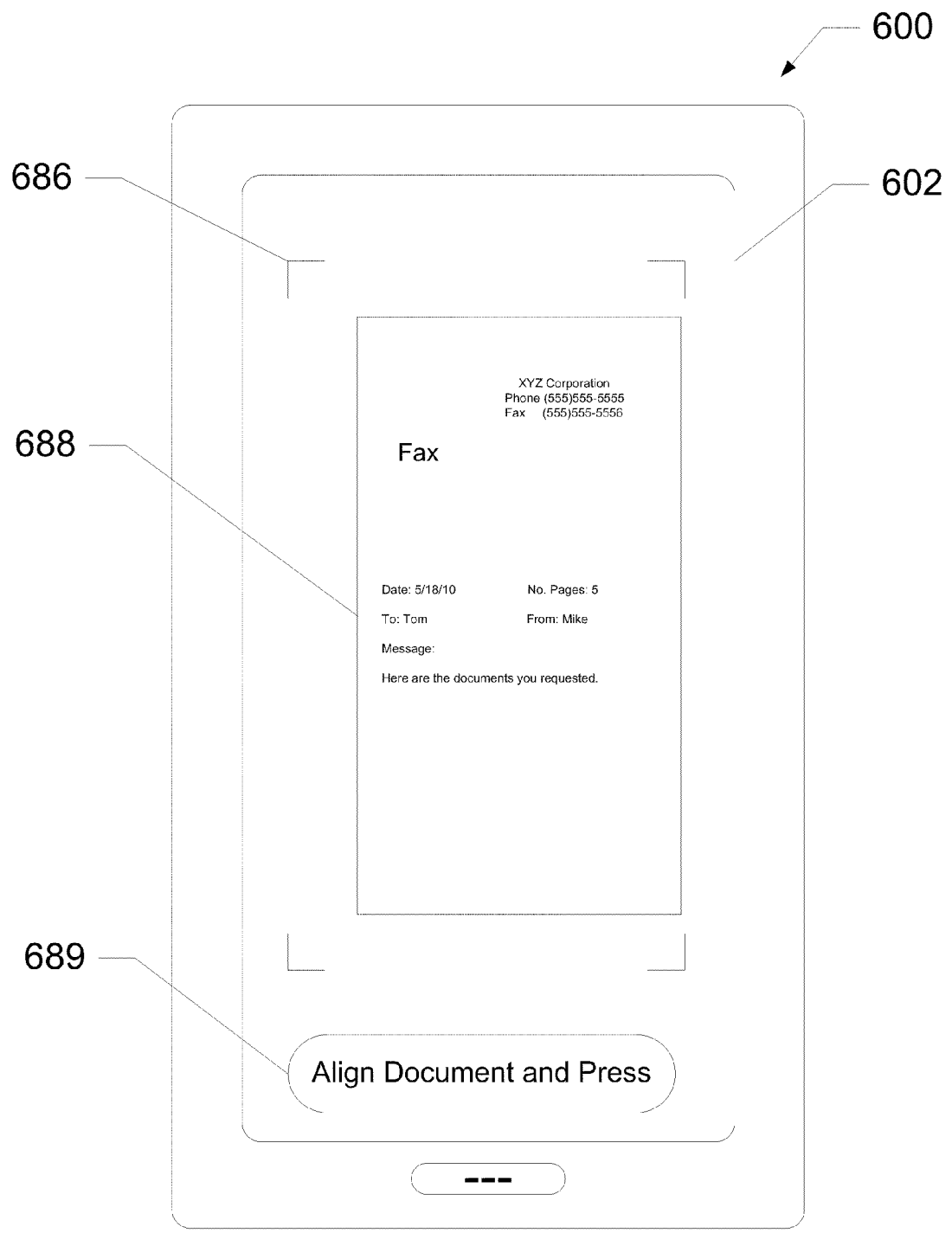
FIG. 6 shows a user interface for scanning a document, according to an exemplary embodiment of the present invention.

FIG. 6 shows a user interface for scanning a document on a mobile device 600, according to an exemplary embodiment of the present invention. In this embodiment, a user desires to send a fax using mobile device 600. The user aligns mobile device 600 such that a camera of mobile device 600 is located above a document. The document, in this instance a fax cover sheet, is seen as a document image 688 on display 602 of mobile device 600 while mobile device 600 is running an image logic. Alignment tabs 686 on display allow the user to align the document properly so that the corners of document image 688 are placed just within alignment tabs 686. Alignment tabs 686 ensure that an image is created of the entire document. The spacing of alignment tabs 686 may be set when the user chooses a size of the paper of the document. Alignment tabs 686 may also provide a grid, alignment lines, etc. to assist the user in alignment of the document. With document image 688 properly aligned, the user presses an image capture button 689 to take a picture of the document. This captures document image 688 and saves document image 688 to a memory of mobile device 600. In embodiments of the present invention, when document image 688 is positioned properly, the image logic automatically captures document image 688.

Once the image of a document is captured, the image may require editing. For instance, the user may desire to crop a portion of the image, may desire to write into a portion of the image (such as when the image is a form and/or a signature is desired to be added to a signature line on the form), may wish to erase a portion of the image, etc.

Figure 7:
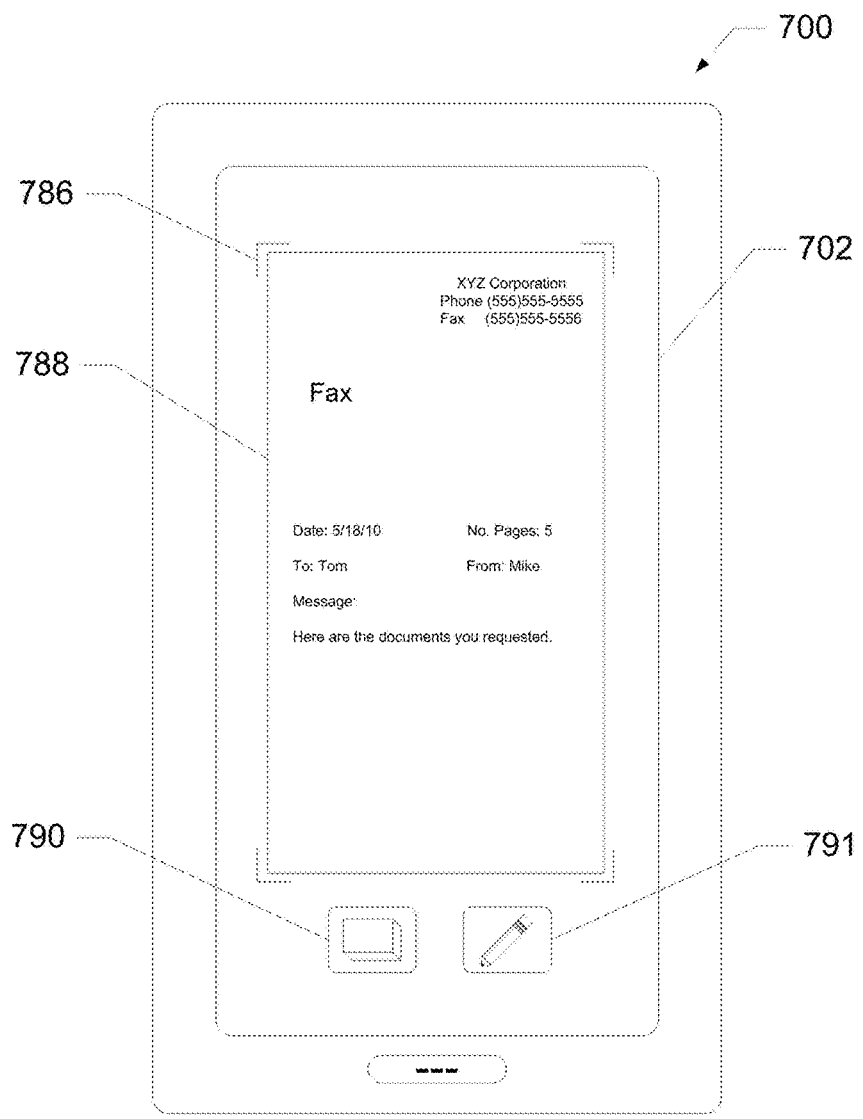
FIG. 7 shows a user interface for annotating a scanned image, according to an exemplary embodiment of the present invention.

FIG. 7 shows a user interface for annotating a scanned image on a mobile device 700, according to an exemplary embodiment of the present invention. In this embodiment, a document image 788 has already been captured from a document using an optical sensor of mobile device 700, or has otherwise been uploaded to mobile device 700. Document image 788 is seen completely within alignment tabs 786 on display 702, as portions of document image 788 within alignment tabs 786 are to be part of a fax transmittal. Image logic on a memory of mobile device 700 allows the user to edit document image 788. The image logic includes features to add to or delete from document image 788. Erase button 790 allows the user to erase portions of document image 788. The user may select erase button 790, and then, for instance, scroll a finger across portions of document image 788 to erase the portions. Write button 791 allows the user to make additions such as notations to document image 788. The user may select write button 791, and then, for instance, sign on a signature line of document image 788.

Embodiments of the faxing application allow the user to enlarge a portion of the document image before editing the document image. For instance, the faxing application may allow the user to zoom in on the signature line of the document image. The user may then use a stylus, or his or her finger, to sign on the signature line. The user may also zoom in on a portion of the document image in order to erase a portion more precisely. In embodiments of the present invention, the user may use a keyboard or keypad of the mobile device to enter text into the document image. This may be useful, for instance, to fill out a blank fax cover sheet form that has been captured through the optical sensor.

Figure 8:
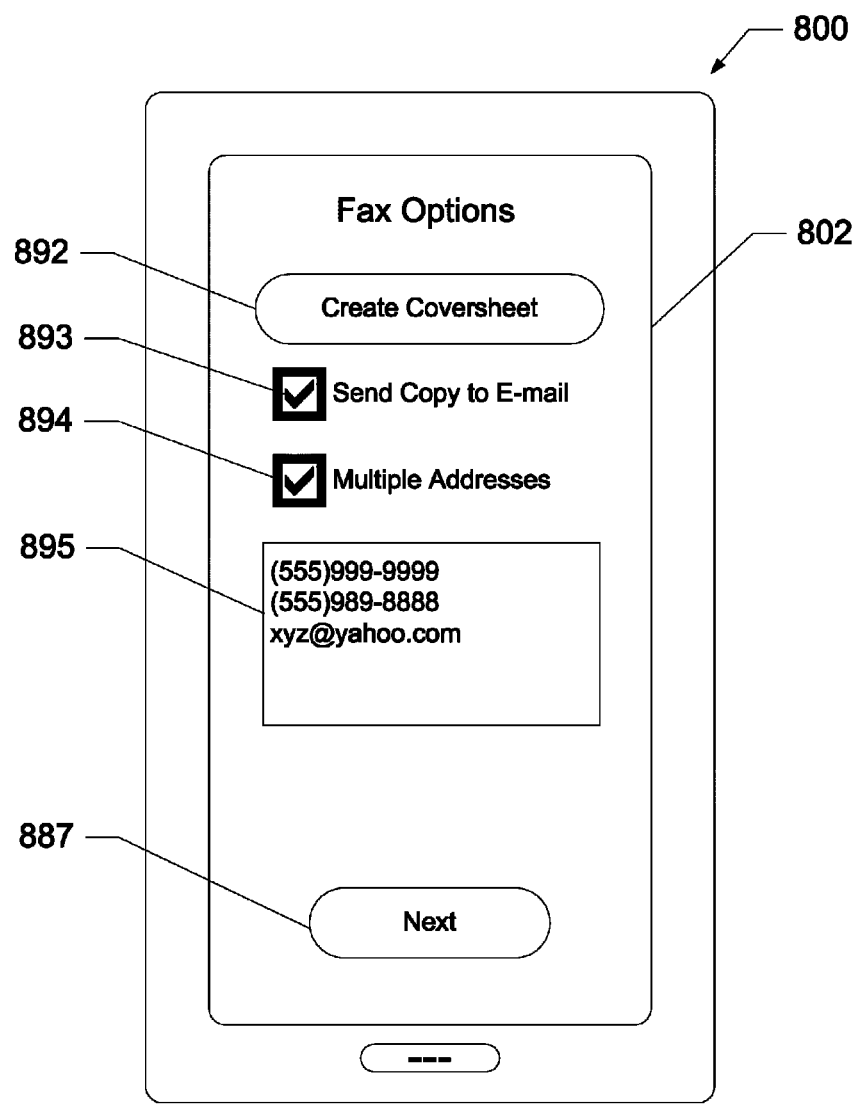
FIG. 8 shows a user interface for transmitting a fax, according to an exemplary embodiment of the present invention.

FIG. 8 shows a user interface for transmitting a fax on a mobile device 800, according to an exemplary embodiment of the present invention. In this embodiment, a user is prompted with faxing options. Faxing options include create coversheet 892, send copy to e-mail 893, multiple addresses 894, and next 887. Create coversheet 892 allows the user to create a coversheet for a fax transmission from the choice of one of a plurality of stored coversheets. Once the user has chosen a coversheet, the user may edit the coversheet using an application such as an application within image logic shown in FIG. 7. Send copy to e-mail 893 provides a checkbox allowing the user select to send a copy of the outgoing fax to the user's e-mail account. The user's e-mail address may be already stored on mobile device 800, a fax application within fax logic may prompt the user for the e-mail address, etc. Multiple addresses 894 allows the user to send the outgoing fax to multiple addresses. These multiple addresses may include fax numbers, phone numbers of devices with similar faxing applications, e-mail addresses, etc. Multiple addresses 894 and send copy to e-mail 893 both include checkboxes to select each option. However, any other means of selecting such an option are also possible. Multiple addresses 894 also includes an entry box 895 for entering the destination addresses. When an outgoing fax is sent to these addresses, the faxing application arranges the addresses into a queue and sends each address the outgoing fax. Entry box 895 may take any form of selecting or entering addresses. Entry box 895 may allow selections from an address book, such as in a scroll menu, a series of checkboxes for contacts, may open a new window on mobile device 800, etc. Next 887 allows the user to accept changes to the fax options and instructs the fax application to take the user to the next page. Alternatively, next 887 accepts the changes to the fax options and sends the outgoing fax.

Figure 9:
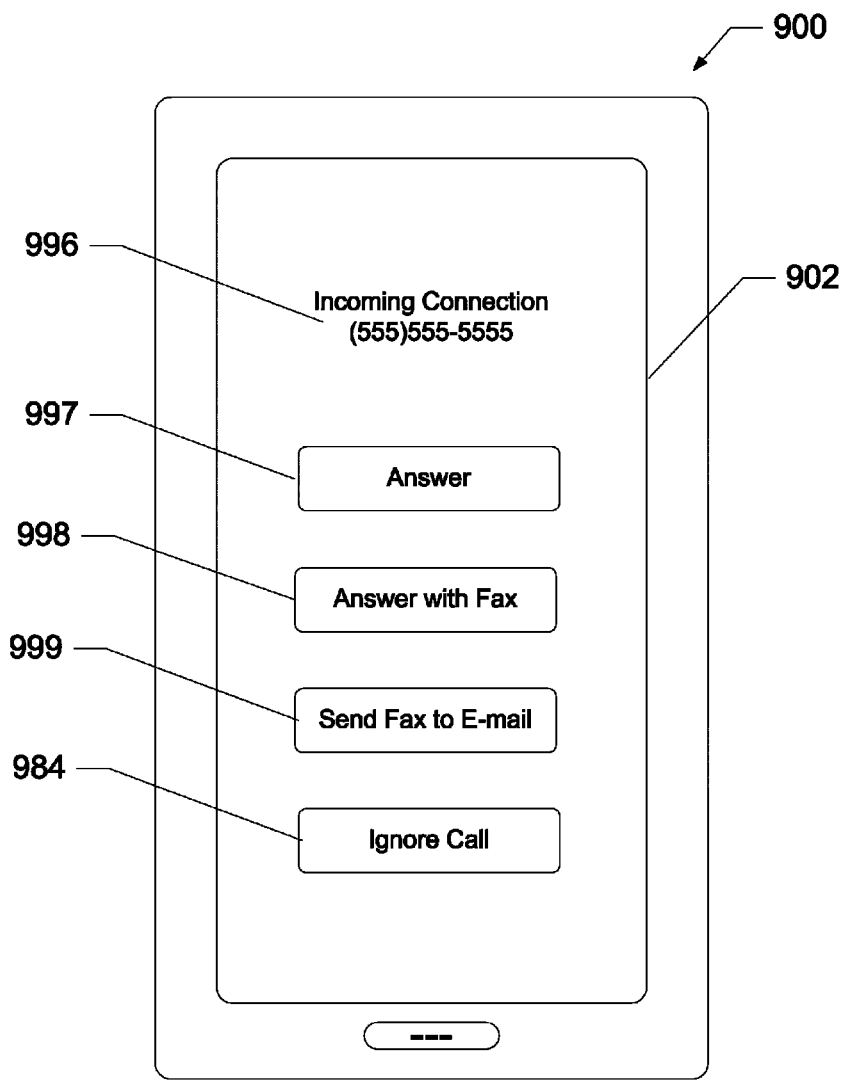
FIG. 9 shows a user interface for receiving a fax, according to an exemplary embodiment of the present invention.

FIG. 9 shows a user interface for receiving a fax on a mobile device 900, according to an exemplary embodiment of the present invention. In this embodiment, an incoming connection 996, such as a call or fax, is incoming to mobile device 900. Incoming connection 996 causes fax logic on mobile device 900 to prompt the user with options for receiving the call. Options include answer 997, answer with fax 998, send fax to e-mail 999, and ignore call 984. If the user does not know the calling party, or knows that the incoming connection is a phone call, the user presses answer 997. Answer 997 creates a voice connection between mobile device 900 and the device requesting communication. If the user knows that the incoming connection is a fax, the user does not want to create a voice connection. The user presses answer with fax 998 to allow a handshake between mobile device and the sending device followed by the fax transmittal. The fax may then be decoded and displayed on display 902 of mobile device 900. If the user knows that the incoming connection is a fax and wishes the fax to be sent to the user's e-mail, the user presses send fax to e-mail 999. This similarly allows the handshake between mobile device 900 and the sending device, and allows the fax transmittal, but the fax transmittal is delivered directly to the user's e-mail account. Further, the user may wish to not receive an incoming call or fax. To ignore an incoming connection, the user may press ignore call 984. Pressing ignore call 984 with an incoming fax refuses the handshake and the fax transmittal. In embodiments of the present invention, ignore call 984 automatically sends a reply to the sending device notifying the sending device to resend the fax at a later time. Pressing ignore call 984 with an incoming voice connection may, for instance, turn off the ringer of mobile device 900 and connect the caller to a voicemail box for mobile device 900.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile device having fax capabilities, comprising:
a processor;
a memory in communication with the processor;
a transceiver in communication with the processor;
an image sensor in communication with the processor;
a display in communication with the processor;
imaging logic on the memory, the imaging logic enabling a user to scan a document into an image using the image sensor, adjust the image, and convert the adjusted image into a fax transmittal;
fax logic on the memory, the fax logic enabling the user to initiate an outgoing connection with a destination device over a network, and transmit the fax transmittal to the destination device;
wherein the fax logic further comprises a fax receiving logic to determine that an incoming connection is a fax transmittal; and
an address book, wherein the fax receiving logic correlates the incoming connection with a fax number in the address book.

2. The mobile device of claim 1, wherein the imaging logic further comprises a user interface enabling the user to adjust a size of the image, the size of the image corresponding to a paper size of the fax transmittal.

3. The mobile device of claim 2, wherein the user interface further enables a user to append notations to the image, the notations including at least a signature and a cover page, wherein the fax transmittal comprises the adjusted image with notations, the signature, and the cover page.

4. The mobile device of claim 2, wherein the image sensor is a camera, and wherein the user interface provides the user with guide lines for scanning a document with the camera.

5. The mobile device of claim 2, wherein the user interface provides the user with an option to transmit the fax transmittal to a plurality of destination addresses, the plurality of destination addresses including an email address.

6. The mobile device of claim 1, wherein the outgoing connection is a telephone call, and wherein the destination device is a fax machine.

7. A system for transmitting a fax transmittal from a mobile device, the system comprising:
a mobile device connected to a network, the mobile device including a camera for scanning a fax transmittal, and logic for adjusting and transmitting the fax transmittal across the network;
a destination device for receiving the fax transmittal;
a plurality of servers on the network to provide an outgoing connection between the mobile device and the destination device,
wherein the mobile device further includes a user interface enabling a user to adjust a page size of the fax transmittal before transmitting;
wherein the logic further comprises a fax receiving logic to determine that an incoming connection is a fax transmittal; and
address book on the mobile device, wherein the fax receiving logic correlates the incoming connection with a fax number in the address book.

8. The system of claim 7, wherein the user interface further enables a user to append notations to the image, the notations including at least a signature and a cover page, wherein the fax transmittal comprises the adjusted image with notations, the signature, and the cover page.

9. The system of claim 7, wherein the plurality of servers includes a gateway server for connecting a cellular network to a Public Switched Telephone Network (PSTN).

10. The system of claim 9, wherein the outgoing connection is a telephone call, and wherein the destination device is a fax machine on the PSTN.

11. The system of claim 9, wherein the cellular network further comprises a data network, and wherein the gateway server is a GPRS Support Node (GSN).

12. A method for transmitting a fax transmittal from a mobile device having a camera, the method comprising:
capturing an image of a document with the camera;
adjusting the image via a user interface on the mobile device, the adjusting including at least one of cropping and resizing the image;
converting the cropped and resized image into a fax transmittal;
initiating a connection with a destination device on a network; and
transmitting the fax transmittal to the destination device;
receiving an incoming connection at the mobile device, determining that the incoming connection is a received fax transmittal, and storing the received fax transmittal as a received image on the mobile device;
wherein the determining step further comprises correlating the incoming connection with a fax number in an address book on the mobile device.

13. The method of claim 12, wherein the converting step further comprises at least one of: appending notations to the image, appending a signature to the image, and adding a cover page to the image, wherein the fax transmittal comprises the adjusted image with at least one of the notations, the signature, and the cover page.

14. The method of claim 12, further comprising transmitting the fax transmittal to a plurality of addresses, the plurality of address including an e-mail address.

* * * * *